(12) United States Patent
Popp et al.

(10) Patent No.: US 8,083,641 B2
(45) Date of Patent: Dec. 27, 2011

(54) METHOD FOR OPERATING AN AUTOMATIC GEARBOX

(75) Inventors: Christian Popp, Kressbronn (DE); Klaus Steinhauser, Kressbronn (DE); Peter Schiele, Kressbronn (DE); Bernd Allgaier, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 747 days.

(21) Appl. No.: 12/225,618

(22) PCT Filed: Feb. 27, 2007

(86) PCT No.: PCT/EP2007/051833
§ 371 (c)(1),
(2), (4) Date: Sep. 26, 2008

(87) PCT Pub. No.: WO2007/113058
PCT Pub. Date: Oct. 11, 2007

(65) Prior Publication Data
US 2009/0233764 A1    Sep. 17, 2009

(30) Foreign Application Priority Data
Mar. 31, 2006  (DE) .......................... 10 2006 014 941

(51) Int. Cl.
*F16H 61/26* (2006.01)
(52) U.S. Cl. ........................................ 477/130; 477/117
(58) Field of Classification Search .................. 477/116, 477/117, 127, 130
See application file for complete search history.

(56) References Cited

U.S. PATENT DOCUMENTS

| | | | |
|---|---|---|---|
| 5,106,352 A | 4/1992 | Le Pelletier | |
| 5,134,903 A | 8/1992 | Itoh | |
| 5,361,651 A | 11/1994 | Wakahara | |
| 5,460,581 A | 10/1995 | Ueda | |
| 5,827,153 A | 10/1998 | Yasue et al. | |
| 5,913,748 A | 6/1999 | Takiguchi | |
| 5,924,957 A | 7/1999 | Yasue et al. | |
| 6,183,393 B1 | 2/2001 | Habeck | |
| 6,375,597 B1 | 4/2002 | Popp et al. | |
| 6,439,362 B2 * | 8/2002 | Reik et al. | 192/3.56 |
| 6,843,754 B2 * | 1/2005 | Mori et al. | 477/92 |
| 6,932,741 B2 * | 8/2005 | Mochizuki et al. | 477/110 |
| 6,938,509 B2 * | 9/2005 | Bulgrien | 74/335 |
| 7,010,911 B2 * | 3/2006 | Morise et al. | 60/422 |
| 7,029,413 B2 | 4/2006 | Sugawara et al. | |
| 7,134,538 B2 | 11/2006 | Hasegawa et al. | |
| 2004/0053734 A1 | 3/2004 | Raghavan et al. | |
| 2004/0087410 A1 | 5/2004 | Usoro et al. | |

(Continued)

FOREIGN PATENT DOCUMENTS

DE          41 21 774 A1    1/1992

(Continued)

*Primary Examiner* — Ha D. Ho
(74) *Attorney, Agent, or Firm* — Davis & Bujold, P.L.L.C.

(57) ABSTRACT

A method for operating an automatic transmission of a motor vehicle, in particular a variable-speed transmission. The automatic transmission includes at least five shift elements and to transfer torque or force transfer in a forward gear and a reverse gear at least three shift of the at least five elements are engaged. When shifting the automatic transmission from a neutral position to a forward or a reverse gear, at least one of the three shift elements of the automatic transmission that are engaged in the respective forward or reverse gear, is engaged in a controlled manner.

8 Claims, 3 Drawing Sheets

U.S. PATENT DOCUMENTS

2004/0132576 A1 7/2004 Usoro et al.
2006/0046892 A1 3/2006 Bucknor et al.

FOREIGN PATENT DOCUMENTS

| DE | 43 34 172 A1 | 4/1994 |
| --- | --- | --- |
| DE | 690 10 472 A1 | 3/1995 |
| DE | 196 49 442 A1 | 6/1997 |
| DE | 197 22 480 A1 | 12/1997 |
| DE | 197 25 513 A1 | 12/1998 |
| DE | 197 50 447 | 6/1999 |
| DE | 100 43 510 A1 | 3/2002 |
| DE | 103 20 775 A1 | 12/2004 |
| DE | 10 2004 035 504 A1 | 2/2005 |
| DE | 10 2004 040 613 A1 | 3/2006 |
| DE | 10 2004 040 642 A1 | 3/2006 |
| DE | 10 2005 005 617 A1 | 3/2006 |
| EP | 0 564 016 A2 | 10/1993 |
| EP | 0 736 706 A2 | 10/1996 |
| EP | 1 416 194 A2 | 5/2004 |
| EP | 1 502 804 A2 | 2/2005 |
| FR | 2 855 583 | 12/2004 |
| WO | WO-2006/017905 A1 | 2/2006 |

\* cited by examiner

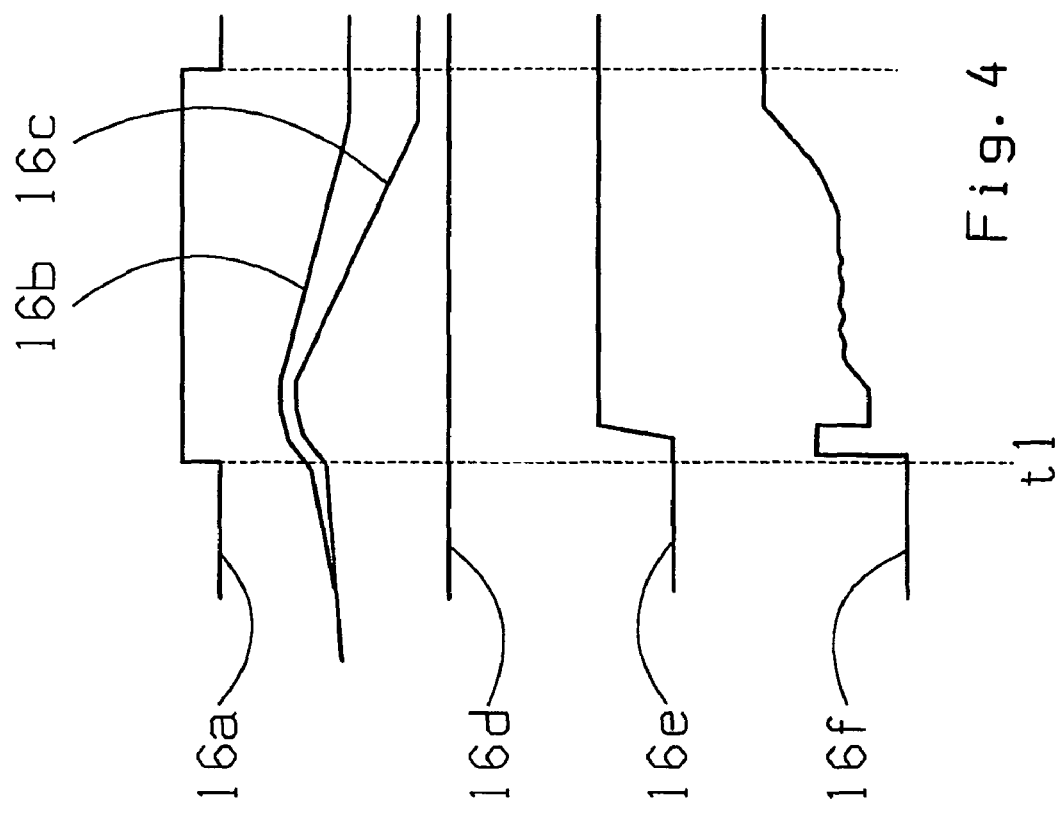
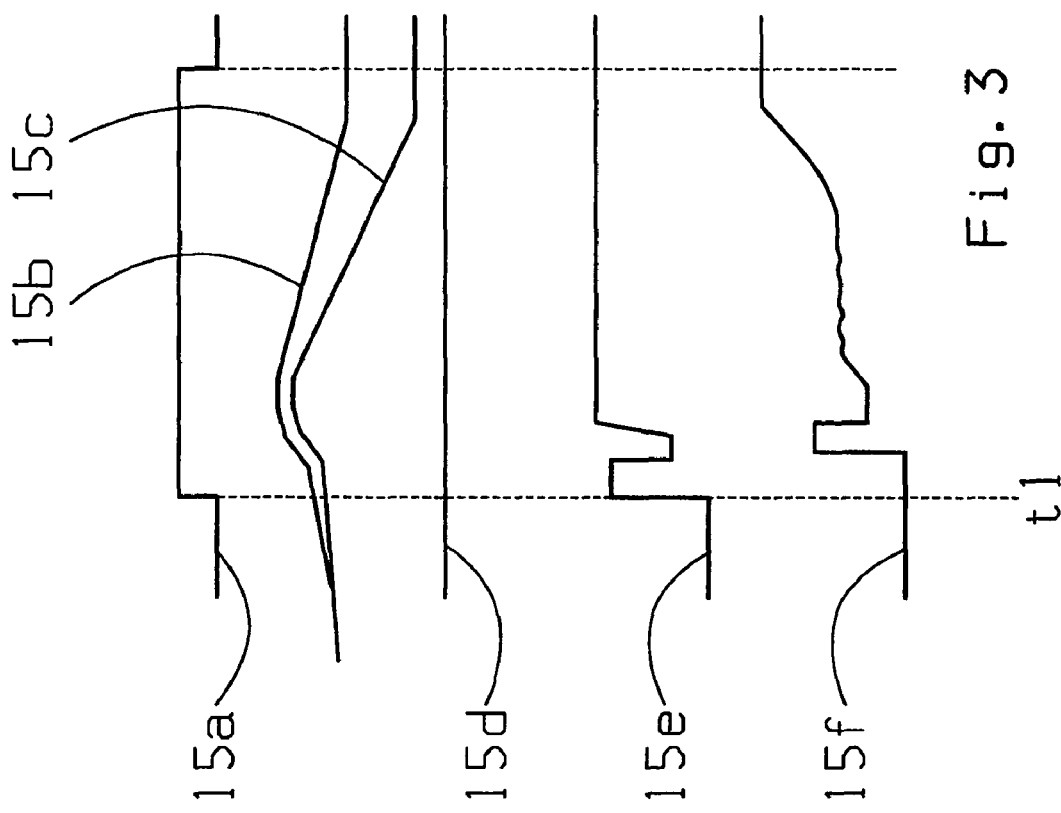

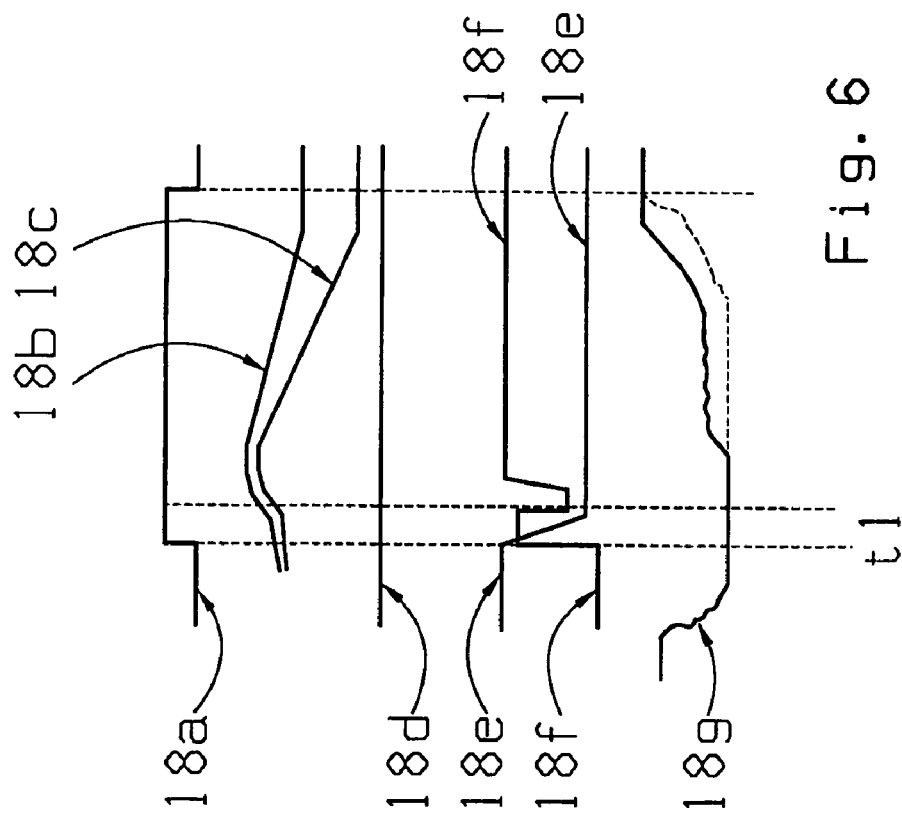
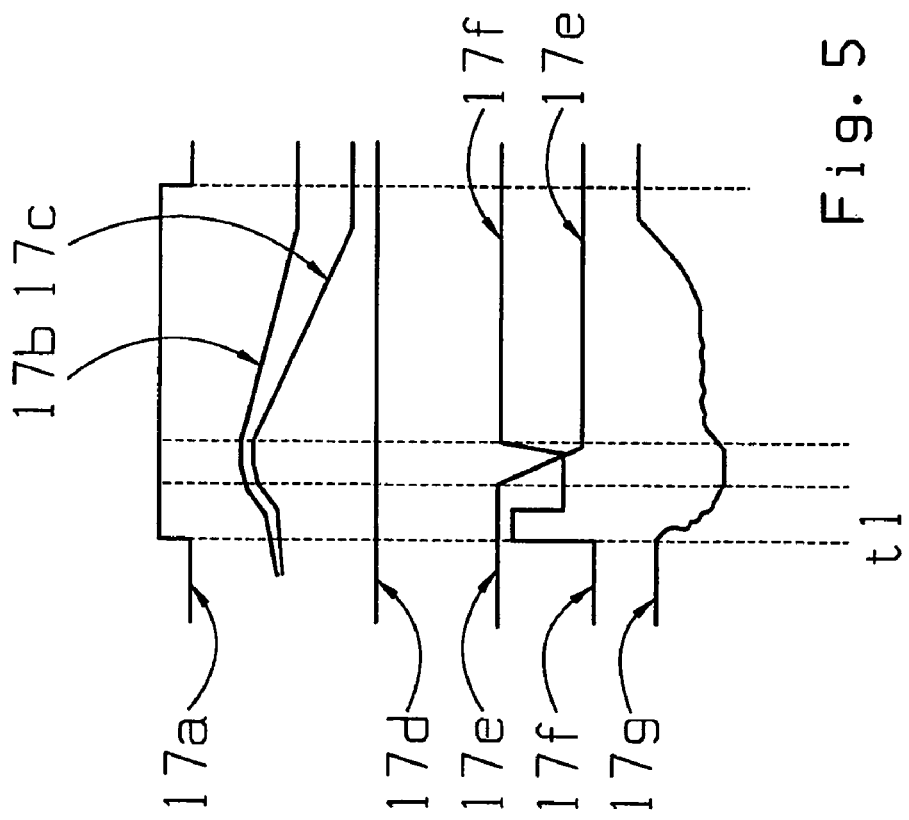

METHOD FOR OPERATING AN AUTOMATIC GEARBOX

This application is a national stage completion of PCT/EP2007/051833 filed Feb. 27, 2007, which claims priority from German Application Serial No. 10 2006 014 941.6 filed Mar. 31, 2006.

FIELD OF THE INVENTION

The invention concerns a method for operating an automatic transmission.

BACKGROUND OF THE INVENTION

Vehicles need transmissions to in order to transform torques and speeds. The task of a vehicle transmission is to convert the traction force potential of a drive engine. The present invention concerns a method for operating an automatic transmission. In the context of this invention the term automatic transmission should be understood to mean any transmission with an automatic gear change, also known as an automatic variable-speed transmission.

In the development of automatic transmissions a continual trend can be observed of increasing the number of gears, particularly the forward gears of an automatic transmission. Thus, at present automatic transmissions with eight forward gears and one reverse gear are being developed, such automatic transmissions having at least five shift elements, and in an automatic transmission of this type at least three of these at least five shift elements are engaged for torque transfer and force transfer in any forward gear and in a reverse gear. In a gear engagement from a neutral position to a forward gear or a reverse gear in such an automatic transmission, the torque or force transfer must be established safely and gently. Until now, however, no methods have been known for operating such automatic transmissions, which ensure safe and gentle gear engagement.

Against this background, the present invention addresses the problem of providing a new type of method for operating an automatic transmission.

SUMMARY OF THE INVENTION

With regard to a first aspect of the present invention, that problem is solved by a method for operating an automatic transmission as defined herein. According to this, in a gear engagement to shift the automatic transmission from a neutral position into a forward or reverse gear, at least one of the shift elements that are engaged in the respective forward or reverse gear is engaged in a controlled manner.

With regard to a second aspect of the present invention, the problem is solved by a method for operating an automatic transmission as defined herein. According to this, in a so-termed gear engagement to shift the automatic transmission from a neutral position, in which all the shift elements that are engaged in the respective forward or reverse gear are also engaged, into a forward or reverse gear, a further shift element present in the drive train is engaged in a controlled manner.

Having regard to a third aspect of the present invention, this problem is solved by a method for operating an automatic transmission. According to this, in a converse gear engagement for shifting the automatic transmission from a reverse gear to a forward gear or from a forward gear to a reverse gear, at least one of the shift elements that is engaged in the forward or reverse gear to be engaged is engaged in a controlled manner.

BRIEF DESCRIPTION OF THE DRAWINGS

The invention will now be described, by way of example, with reference to the accompanying drawings in which:

FIG. 3 is a sequence diagram for gear engagement from a neutral position to a forward gear, according to one alternative of a first aspect of the present invention;

FIG. 4 is a sequence diagram for gear engagement from a neutral position to a forward gear, according to another alternative of a first aspect of the present invention;

FIG. 5 is a sequence diagram for gear engagement from a reverse gear into a forward gear, according to an alternative of a first aspect of the present invention, and FIG. 6 is a sequence diagram for gear engagement from a reverse gear into a forward gear, according to another alternative of a first aspect of the present invention.

DETAILED DESCRIPTION OF THE INVENTION

Figures 1, 2:
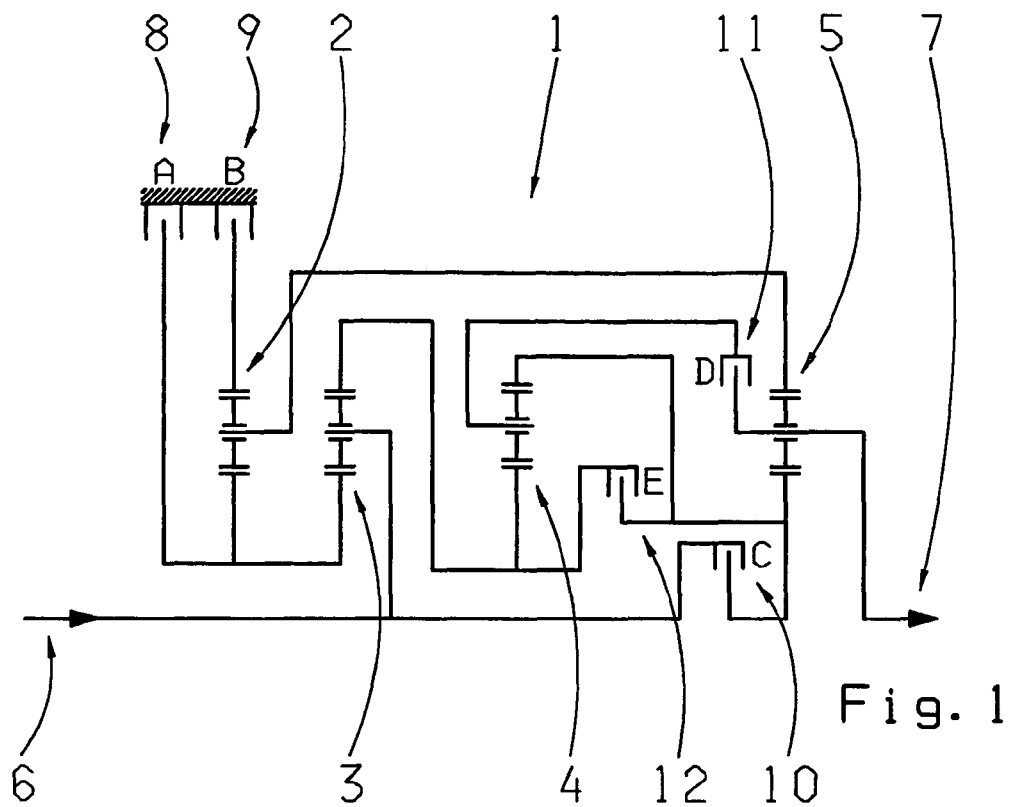
FIG. 1 is a transmission layout of an automatic transmission with five shift elements, in which the method according to the invention can be used advantageously.
FIG. 2 is a shift element matrix for the shift elements of the transmission layout in FIG. 1, to make clear which shift elements are engaged in which gear.

The present invention concerns a method for operating an automatic transmission.

FIG. 1 shows a transmission layout 1 of a variable-speed transmission in which the method for operating an automatic transmission is preferably used. The automatic transmission of FIG. 1 has a total of four transmission gearsets 2, 3, 4 and 5 designed to convert a transmission input torque applied to a transmission input 6 into a transmission output torque at a transmission output 7. The transmission gearsets 2, 3, 4 and 5 of the automatic transmission in FIG. 1 are made as planetary transmission gearsets.

As shown in the transmission layout 1 of FIG. 1, besides the four transmission gearsets 2 to 5, the automatic transmission also comprises a total of five shift elements 8, 9, 10, 11 and 12. The shift element 8 also is denoted as shift element A; shift element 9 denoted as shift element B; shift element 10 denoted as shift element C; shift element 11 denoted as shift element D, and shift element 12 denoted as shift element E.

The shift elements A and B are both brakes whereas the shift elements C, D and E are all clutches. The shift elements 8 to 12 are shift elements of the transmission gearset system.

In the automatic transmission, represented schematically in FIG. 1, comprising the five shift elements A to E, application of a shift matrix 14, shown in FIG. 2, can produce eight forward gears and one reverse gear. The eight forward gears "1" to "8" and the reverse gear "R" are entered down the left-hand column of the shift matrix 14, and the shift elements A to E along its top row. Shift elements marked with a spot in the shift element matrix 14 are engaged in the respective gear. It can be seen that in each case three of the five shift elements are engaged for each forward gear and for the reverse gear, as for example the shift elements A, B and C for forward gear "1" and shift elements A, B and D for the reverse gear "R". In contrast, the respective other shift elements are fully disengaged.

Thus, for the transfer of force or torque from the transmission input 6 to the transmission output 7 in the automatic transmission, shown in FIG. 1, in each gear three shift elements are fully engaged while two shift elements are fully disengaged. The present invention now provides a method for operating an automatic transmission of this type.

According to a first embodiment of the present invention, for engaging a gear so as to shift the automatic transmission from a neutral position into a forward or reverse gear, at least one of the shift elements of the automatic transmission that are engaged in the respective forward or reverse gear is engaged in a controlled manner.

The shift element to be engaged in a controlled manner in order to engage the gear is a shift element that produces torque or force transfer in the automatic transmission, which is only engaged when the other shift elements that are engaged in the respective forward or reverse gear are already engaged. The specific procedure for gear engagement depends on the condition in which the shift elements are in the neutral position so that a distinction has to be made between several alternatives of this aspect of the present invention.

According to the first embodiment of the present invention, in the neutral position of an automatic transmission, all the shift elements that are engaged in the respective forward or reverse gear are completely disengaged. This is particularly the case when, in the neutral position, it is important to guard against multiple errors, for example when a hydraulic function at the onset of emergency operation would lead to the engagement of a drive position or when this is necessary for reasons related to the transmission mechanics, for example because of internal speed situations.

In the example embodiment illustrated, the first alternative of the first embodiment of the present invention is applied when, starting from forward gear "6", the automatic transmission has been shifted to the neutral position.

In such a case, if gear engagement from the neutral position to a forward gear takes place, then first of all two of the three completely disengaged shift elements are simultaneously engaged or with a time offset and then the third shift element, which produces the torque or force transfer of the automatic transmission, is engaged in a controlled manner.

A second alternative of the first embodiment of the present invention for gear engagement in an automatic transmission concerns the case in which a first one of the shift elements that are engaged in the respective forward or reverse gear is also engaged in the neutral position, while in contrast, a second and a third of the shift elements engaged in the respective forward or reverse gear are fully disengaged.

The procedure then to be adopted for engaging a gear so as to shift the automatic transmission from the neutral position to a forward or reverse gear is described below with reference to FIG. 3, which shows a total of six signal-time patterns 15a, 15b, 15c, 15d, 15e and 15f. Signal pattern 15a represents a shift demand for gear engagement at time $t_1$, while signal patterns 15d, 15e and 15f show the behavior or control of the shift elements that are engaged after the gear engagement into the correspondingly forward or reverse gear. Signal pattern 15b shows the pattern of engine speed involved, whereas signal 15c shows the pattern of the transmission input speed.

As can be seen from FIG. 3, in the case when one of the shift elements that are engaged in the respective forward or reverse gear is also engaged in the neutral position (see signal variation 15d) and the other two shift elements engaged in the forward or reverse gear are completely disengaged in the neutral position (see signal variations 15e and 15f), to shift the automatic transmission from the neutral position to a forward or reverse gear at time $t_1$, when a shift demand for gear engagement is made, first of all one of the two shift elements completely disengaged in the neutral position is rapidly filled (see signal variation 15e) so that due to the rapid filling, this shift element is changed from the fully disengaged, to a partially filled condition.

In this partially filled condition, it transfers no or almost no torque but an air gap in it has been closed or bridged. After the rapid filling of one of the two shift elements, the other of the two shift elements fully disengaged in the neutral position is also changed to a partially filled condition by rapid filling so that it too transfers no or almost no torque and, at the same time, the other of the two shift elements (see signal variation 15e) is completely engaged. Then, as shown by signal variation 15f, the still partially filled shift element, which produces the torque or force transfer of the automatic transmission, is engaged in a controlled manner.

This second alternative of the first embodiment of the present invention for gear engagement is preferably used when, in the neutral position, security against simple errors must be ensured while, at the same time, the reaction time in the subsequent gear engagement is sufficient.

In the example embodiment illustrated, the second alternative of the first aspect of the present invention is used when, before the gear engagement, starting from forward gears "3" or "4" or "5" or "7" or "8", the automatic transmission has been shifted to the neutral position or starting from its neutral position, it is to be shifted into one of these forward gears by gear engagement.

A third alternative of the first aspect of the invention for gear engagement in an automatic transmission concerns the case when a first of the shift elements that are engaged in the respective forward or reverse gear is engaged in the neutral position, a second of the shift elements engaged in the forward or reverse gear is partially filled in the neutral position so that it transfers no or almost no torque, and a third of the shift elements engaged in the forward or reverse gear is completely disengaged in the neutral position. The procedure for this case is described below with reference to FIG. 4, which by analogy with FIG. 3 again shows six signal-time patterns 16a, 16b, 16c, 16d, 16e and 16f. Signal pattern 16d corresponds to the behavior or control of the first shift element, the one which is engaged in the neutral position, signal pattern 16e corresponds to the behavior of the second shift element which is partially filled in the neutral position, and signal pattern 16f corresponds to the third shift element which is fully disengaged in the neutral position. The signal-time pattern 16a again represents the occurrence of a shift demand for gear engagement at time $t_1$, signal pattern 16b shows the engine speed pattern and signal pattern 16c shows the transmission input speed pattern.

According to this third alternative of the first embodiment of the present invention, to shift the automatic transmission from the neutral position to a forward or reverse gear, for gear engagement and in accordance with signal pattern 16e the second shift element, which is partially filled in the neutral position, is preferably first engaged, and then, in accordance with signal pattern 16f the third shift element, that which produces the torque or force transfer of the automatic transmission, is engaged in a controlled manner so that from the fully disengaged position it is changed by rapid filling to a partially filled condition and from then on, engaged in a controlled manner.

By contrast with the procedure represented in FIG. 4, in the third alternative of the first embodiment of the present invention, however, it is also possible when shifting the automatic transmission from the neutral position to a forward or reverse gear, to engage the third shift element first and then, in a controlled manner, the second shift element which produces the torque or force transfer of the automatic transmission. This is preferably done when additional functions, such as a static decoupling function, have to be implemented.

The third alternative of the first embodiment of the present invention is preferably used for gear engagement when, in the neutral position, sufficient security against simple errors must be ensured, which at least means that the vehicle cannot roll along and, at the same time, there must be a good reaction time in a subsequent gear engagement.

In the example embodiment illustrated, the third alternative of the first embodiment of the present invention is used when, starting from forward gears "1" or "2" or from the reverse gear "R", the automatic transmission has been shifted to the neutral position or when it is to be shifted from the neutral position into one of those gears by gear engagement.

The above three alternatives of the first embodiment of the present invention are preferably used in combination with one another for operating an automatic transmission when engaging gears, depending on the respective neutral position from which the automatic transmission is to be shifted into a gear.

Thus, for neutral positions from which as a matter of course, a gear is engaged, that alternative (the third alternative) is chosen which gives the best reaction time. For other neutral positions in which, as a matter of course, a gear is engaged only while driving, that alternative (the second alternative) is chosen which places the greatest weight on safety, since reaction time is then not so critical.

If there are hydraulic reasons or ones related to the transmission mechanics which do not allow a shift element to be kept engaged, then the first alternative is chosen.

A fourth alternative of the first embodiment of the present invention concerns the case when two of the shift elements that are engaged in the respective forward or reverse gear are also engaged in the neutral position, and only one of the shift elements engaged in the forward or reverse gear is completely disengaged in the neutral position. In this alternative, to shift the automatic transmission from neutral to a forward or reverse gear the shift element that is completely disengaged in the neutral position is engaged in a controlled manner, preferably such that this shift element is first brought by rapid filling from the fully disengaged condition to a partially filled condition and then, from that partially filled condition in which it transfers no or almost no torque, it is engaged in a controlled manner.

FIG. 5 illustrates the procedure for changing gears from the reverse gear "R" to the forward gear "I" or from the forward gear "I" to the reverse gear "R", i.e., when the shift element of the automatic transmission that determines the force flow direction is changed. FIG. 5 shows a total of seven signal-time patterns 17a, 17b, 17c, 17d, 17e, 17f and 17g. According to signal pattern 17a, at time $t_1$ a shift demand is made for a gear change from the reverse gear to the forward gear or vice-versa, while signal pattern 17b shows the engine speed pattern and signal pattern 17c shows the transmission input speed variation involved.

As shown by signal pattern 17d, during the gear change from the reverse gear "R" to the forward gear "I" or vice-versa, one of the shift elements remains permanently engaged, this shift element, according to FIGS. 1 and 2, being in particular shift element A. To carry out the gear change from reverse "R" to forward "I", or vice-versa, as shown by signal pattern 17g, a second shift element, in particular shift element B, is temporarily changed from the engaged condition to a partially filled condition in which it transfers no or almost no torque. During this interval in which the shift element, represented by signal pattern 17g, transfers no or almost no torque, to carry out the gear change from reverse "R" to forward "I" or vice-versa, a change between the third shift elements can be carried out. These shift elements are the shift elements C and D.

Then, when a change from reverse gear "R" to forward gear "I" is carried out, the control of shift element D, is as shown by signal pattern 17e and that of shift element C by signal pattern 17f, whereas in contrast, when a gear change is to be carried out from forward gear "I" to the reverse gear "R", signal pattern 17e shows the control of shift element C and signal pattern 17f that of shift element D.

With reference again to seven signal patterns 18a, 18b, 18c, 18d, 18e, 18f and 18g, FIG. 6 illustrates the procedures for changing gear from reverse "R" to forward gear "I" or vice-versa by analogy with FIG. 5, when additional other functions, such as a static decoupling function are to be implemented.

In this case, as can be seen from signal pattern 18g in FIG. 6, the shift element that produces the torque or force transfer of the automatic transmission is brought to a partially filled condition already at a time earlier than the appearance of the shift demand at time $t_1$ so that it transfers no or almost no torque. The controlled engagement of this shift element after carrying out the gear change from reverse "R" to forward "I" gear, or vice-versa, takes place depending on when the actuation of an accelerator pedal terminates the static decoupling function. In the broken-line version of signal pattern 18g, this occurs later than in the continuous-line version thereof.

The second embodiment of the present invention concerns a method for shifting an automatic transmission from a neutral position to a forward or reverse gear, when all the shift elements that are engaged in the respective forward or reverse gear are also engaged in the neutral position. In this case, to change gears a further shift element in the drive train is engaged in a controlled manner, and this further shift element can also be inside the transmission unit. The further shift element, which is located upstream or downstream from the automatic transmission, can be an external starting element. For example in parallel hybrid systems in which an electric motor and a combustion engine act upon an automatic transmission, such external starting elements are located upstream from the automatic transmission.

The alternatives of the first embodiment of the invention for controlling the shift elements when engaging a gear can be combined with this second embodiment for controlling the further shift element in accordance with the second embodiment of the invention.

Although with reference to FIGS. 1 and 2, the invention has been described for the preferred application case of an automatic transmission with five shift elements, three of which at a time are engaged in any forward gear and in a reverse gear. It should be made clear at this point that the invention can also be used with automatic transmissions having a larger number of shift elements, and certainly also when a larger number of shift elements are engaged in any gear. In such cases, the number of disengaged or partially filled shift elements is adapted to the systems in question and the additional shift elements are kept engaged so that, compared with the method described above only the number of engaged shift elements is different.

Finally, let it be said that the shift elements A to E or 8 to 12, controlled in accordance with the first embodiment of the invention, can also be referred to as shift elements internal to the transmission or internal to the transmission gearset system, whereas the further shift element in the drive train, which is relevant for the second embodiment of the invention, can be referred to as the shift element external to the transmission or external to the transmission gearset system.

REFERENCE NUMERALS

| Reference numerals | |
|---|---|
| 1 | transmission layout |
| 2 | transmission gearset |
| 3 | transmission gearset |
| 4 | transmission gearset |
| 5 | transmission gearset |
| 6 | transmission input |
| 7 | transmission output |
| 8 | shift element A |
| 9 | shift element B |
| 10 | shift element C |
| 11 | shift element D |
| 12 | shift element E |
| 14 | shift element matrix |
| 15a | pattern |
| 15b | pattern |
| 15c | pattern |
| 15d | pattern |
| 15e | pattern |
| 16b | pattern |
| 16c | pattern |
| 16d | pattern |
| 16e | pattern |
| 16f | pattern |
| 17a | pattern |
| 17b | pattern |
| 17c | pattern |
| 17d | pattern |
| 17e | pattern |
| 17f | pattern |
| 17g | pattern |
| 18a | pattern |
| 18b | pattern |
| 18c | pattern |
| 18d | pattern |
| 18e | pattern |
| 18g | pattern |

The invention claimed is:

1. A method for operating an automatic transmission of a motor vehicle, the automatic transmission comprising at least five shift elements, at least three shift elements of the at least five shift elements are engaged to transfer one of torque or force in a forward gear and a reverse gear, and to shift the automatic transmission from a neutral position to one of the forward gear and the reverse gear, at least one shift element of the at least three shift elements that are engaged in the forward gear and the reverse gear is engaged in a controlled manner, the method comprising the steps of:
engaging the shift element that transfers the one of the torque or the force of the automatic transmission to shift the automatic transmission from the neutral position to the respective forward or reverse gear in the controlled manner only if the other shift elements that are engaged in the forward gear or the reverse gear are already engaged; and
engaging at least two shift elements one of independently or simultaneously to shift the automatic transmission from the neutral position to the forward gear or the reverse gear, if all of the at least three shift elements that are engaged in the respective forward gear and the reverse gear are completely disengaged in the neutral position, and then engaging the shift element that transfers the one of the torque or the force of the automatic transmission in the controlled manner.

2. A method for operating an automatic transmission of a motor vehicle, the automatic transmission comprising at least five shift elements, at least three shift elements of the at least five shift elements are engaged to transfer one of torque or force in a forward gear and a reverse gear, and to shift the automatic transmission from a neutral position to one of the forward gear and the reverse gear, at least one shift element of the at least three shift elements that are engaged in the forward gear and the reverse gear is engaged in a controlled manner, the method comprising the steps of:
engaging the shift element that transfers the one of the torque or the force of the automatic transmission to shift the automatic transmission from the neutral position to the respective forward or the reverse gear in the controlled manner only if the other shift elements that are engaged in the forward gear or the reverse gear are already engaged; and
partially filling a second one of the shift elements that is engaged in the forward gear or the reverse gear such that the second one of the shift elements transfers substantially no torque when a first one of the shift elements that is engaged in the forward gear or the reverse gear is engaged in the neutral position, and a third one of the shift elements that is engaged in the forward gear or the reverse gear is completely disengaged in the neutral position, then engaging the second one of the shift elements to shift the automatic transmission from the neutral position to the respective forward or reverse gear.

3. The method for operating an automatic transmission of a motor vehicle according to claim 2, further comprising the step of engaging the third one of the shift elements that is engaged in the forward gear or the reverse gear in the controlled manner.

4. A method for operating an automatic transmission of a motor vehicle, the automatic transmission comprising at least five shift elements, at least three shift elements of the at least five shift elements are engaged to transfer one of torque or force in a forward gear and a reverse gear, and to shift the automatic transmission from a neutral position to one of the forward gear and the reverse gear, at least one shift element of the at least three shift elements that are engaged in the forward gear and the reverse gear is engaged in a controlled manner, the method comprising the steps of:
to shift the automatic transmission from the neutral position to the respective forward or reverse gear, a shift element that produces the torque or force transfer of the automatic transmission is engaged in the controlled manner only when the other shift elements that are engaged in the forward or reverse gear are already engaged,
and when a first one of the shift elements that are engaged in the respective forward or reverse gear is engaged in the neutral position, a second one of the shift elements engaged in the forward or reverse gear is partially filled in the neutral position so that the second one of the shift elements transfers no or almost no torque and a third of the shift elements engaged in the forward or reverse gear is completely disengaged in the neutral position,
to shift the automatic transmission from the neutral position to the forward or reverse gear the third shift element is first engaged.

5. The method for operating an automatic transmission of a motor vehicle according to claim 4, further comprising the step of engaging the second one of the shift elements that is engaged in the forward gear or the reverse gear in the controlled manner.

6. A method for operating an automatic transmission of a motor vehicle, the automatic transmission comprising at least five shift elements, at least three shift elements of the at least five shift elements are engaged to transfer one of torque or force in a forward gear and a reverse gear, and to shift the automatic transmission from a neutral position to one of the forward gear and the reverse gear, at least one shift element of the at least three shift elements that are engaged in the forward gear and the reverse gear is engaged in a controlled manner, the method comprising the steps of:

to shift the automatic transmission from the neutral position to the respective forward or reverse gear a shift element that produces the torque or force transfer of the automatic transmission is engaged in the controlled manner only when the other shift elements that are engaged in the forward or reverse gear are already engaged, and when a first one of the shift elements that are engaged in the respective forward or reverse gear is engaged in the neutral position, and a second and third of the shift elements engaged in the respective forward or reverse gear are completely open in the neutral position, then to shift the automatic transmission from the neutral position to the forward or to the reverse gear the second and third shift elements are brought to a partially filled condition in which they transfer no or almost no torque, one of the two partially filled shift elements is engaged, and finally the other of the partially filled shift elements, that which produces the torque or force transfer of the automatic transmission, is engaged in the controlled manner.

7. A method for operating an automatic transmission of a motor vehicle, the automatic transmission comprising at least five shift elements, at least three shift elements of the at least five shift elements are engaged to transfer one of torque or force in a forward gear and a reverse gear and such that associated with the automatic transmission there is a further shift element which is located one of upstream and downstream from the automatic transmission and is also engaged for the torque or force transfer in the forward or reverse gear, in a so-termed gear engagement to shift the automatic transmission from a neutral position to the forward or the reverse gear, all the shift elements of the automatic transmission that are engaged in the respective forward or reverse gear are already engaged in the neutral position and the further shift element located in the drivetrain is engaged in a controlled manner during the gear engagement process.

8. A method for operating an automatic transmission of a motor vehicle, the automatic transmission comprising at least five shift elements, at least three shift elements of the at least five shift elements are engaged to transfer one of torque or force in a forward gear and a reverse gear and such that for a so-termed converse gear engagement to shift the automatic transmission from the reverse gear to the forward gear or from the forward gear to the reverse gear, at least one of the shift elements of the automatic transmission that are engaged in the forward or reverse gear to be engaged is engaged in the controlled manner, a method comprising the steps of:

a first shift element remains permanently engaged, a second shift element for carrying out the converse gear change is brought from the engaged condition temporarily to a partially filled condition in which the second shift element transfers no or almost no torque, a change between third shift element being carried out during this interval in which the second shift element transfers no or almost no torque, and then the second shift element is engaged in the controlled manner.

* * * * *